(12) United States Patent
Nakajima

(10) Patent No.: US 9,895,925 B2
(45) Date of Patent: Feb. 20, 2018

(54) PRODUCT COMPRISING SOLID ADHERED TO ELASTIC MEMBER

(71) Applicant: GINGAM JAPAN LTD., Osaka (JP)

(72) Inventor: Shoji Nakajima, Osaka (JP)

(73) Assignee: GINGAM JAPAN LTD., Osaka (JP)

(*) Notice: Subject to any disclaimer, the term of this patent is extended or adjusted under 35 U.S.C. 154(b) by 0 days.

(21) Appl. No.: 15/316,654

(22) PCT Filed: Jun. 18, 2015

(86) PCT No.: PCT/JP2015/003063
§ 371 (c)(1),
(2) Date: Dec. 6, 2016

(87) PCT Pub. No.: WO2015/194184
PCT Pub. Date: Dec. 23, 2015

(65) Prior Publication Data
US 2017/0136808 A1   May 18, 2017

(30) Foreign Application Priority Data

Jun. 20, 2014 (JP) ................. 2014-127708

(51) Int. Cl.
*B44C 1/18* (2006.01)
(52) U.S. Cl.
CPC ..................... *B44C 1/18* (2013.01)
(58) Field of Classification Search
CPC .. B44C 1/18; A44C 5/00; A44C 15/00; A44C 27/00; D01Q 1/10; D06Q 1/10; D06Q 1/12; D06Q 1/00; A41D 27/08
See application file for complete search history.

(56) References Cited

U.S. PATENT DOCUMENTS

| | | | |
|---|---|---|---|
| 2002/0117258 A1 | 8/2002 | Nakajima et al. | |
| 2005/0143510 A1* | 6/2005 | Nakayama | C08F 297/08 524/425 |

(Continued)

FOREIGN PATENT DOCUMENTS

| | | |
|---|---|---|
| JP | 63-075193 A | 4/1988 |
| JP | 2002-249729 A | 9/2002 |

(Continued)

OTHER PUBLICATIONS

International Search Report for corresponding International Application No. PCT/JP2015/003063 dated Sep. 8, 2015.

(Continued)

*Primary Examiner* — Laura C Powers
(74) *Attorney, Agent, or Firm* — Renner, Otto, Boisselle & Sklar, LLP

(57) ABSTRACT

The present invention provides adhesion of a solid to an elastic member with a sufficient adhesive strength. The present invention, specifically, provides a product comprising an elastic member having at least 200% elongation and a solid adhered to the elastic member with a hot-melt adhesive. Specifically, according to the present invention, adhesion of an elastic member and a solid of excellent durability with adhesive force of $2.5 \times 10^6$ Pa or more, more preferably adhesive force of $2.7 \times 10^6$ Pa or more, even more preferably adhesive force of $3.0 \times 10^6$ Pa or more, and particularly preferably adhesive force of $3.5 \times 10^6$ Pa or more, is provided.

9 Claims, 5 Drawing Sheets

(56) References Cited

U.S. PATENT DOCUMENTS

| | | | | |
|---|---|---|---|---|
| 2007/0207903 | A1* | 9/2007 | Csabai | A63B 21/0004 |
| | | | | 482/121 |
| 2010/0115793 | A1* | 5/2010 | Kraisosky | A43B 3/0078 |
| | | | | 36/94 |
| 2011/0223392 | A1* | 9/2011 | Dickey | B32B 7/12 |
| | | | | 428/195.1 |
| 2015/0199923 | A1* | 7/2015 | Di Battista | B44C 5/005 |
| | | | | 156/249 |

FOREIGN PATENT DOCUMENTS

| | | |
|---|---|---|
| JP | 3142118 U | 6/2008 |
| JP | 2010-168717 A | 8/2010 |
| JP | 2013-104146 A | 5/2013 |

OTHER PUBLICATIONS

Official Action for related Japanese Application No. 2014-127708 dated Oct. 8, 2014.

* cited by examiner

[Fig.1]
(A)
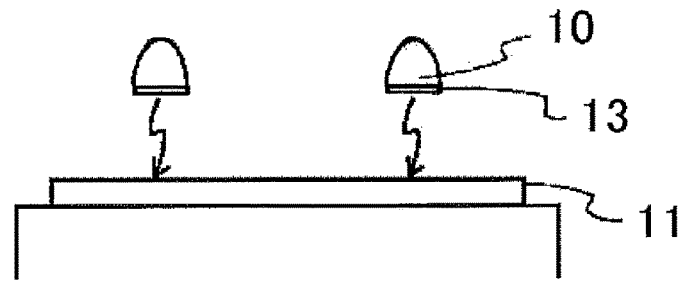
(B)
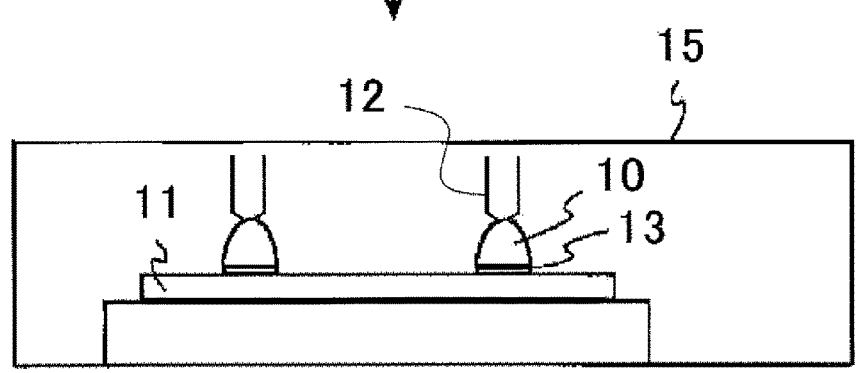
(C)
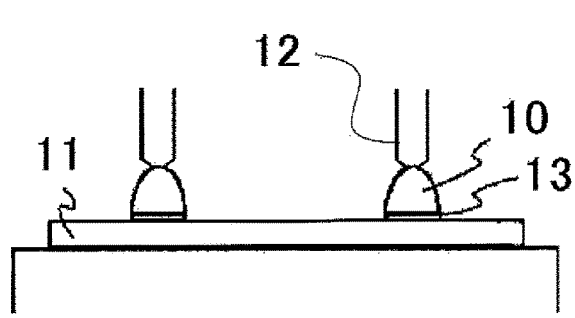

[Fig.2]
(A)
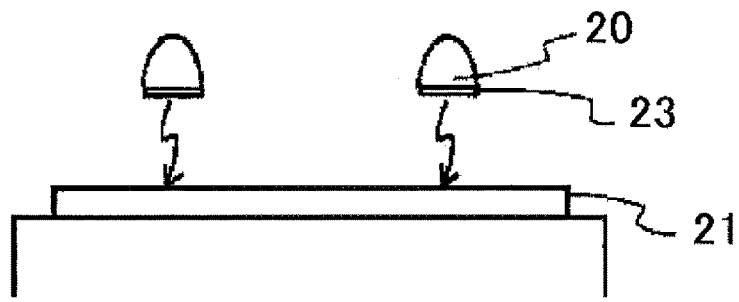
(B)
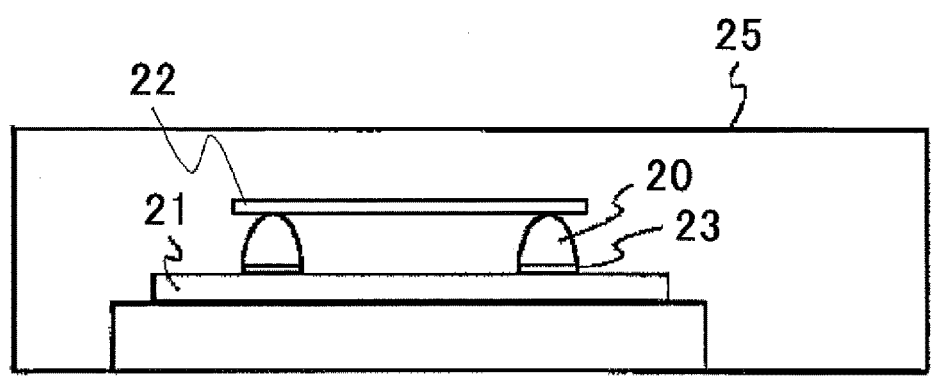
(C)
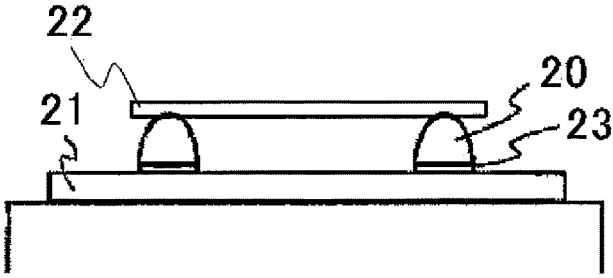

[Fig.3]
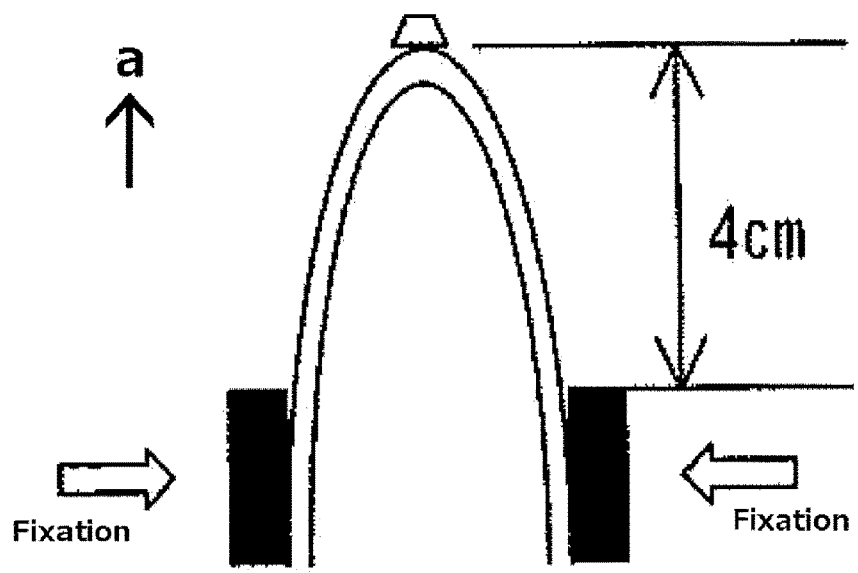
[Fig.4]
| Sample | Falling off number/ initially adhered number |
|---|---|
| 2 days N=1 | 1/33 |
| 2 days N=2 | 0/33 |
| 4 days N=1 | 0/33 |
| 4 days N=2 | 1/33 |

[Fig.5]
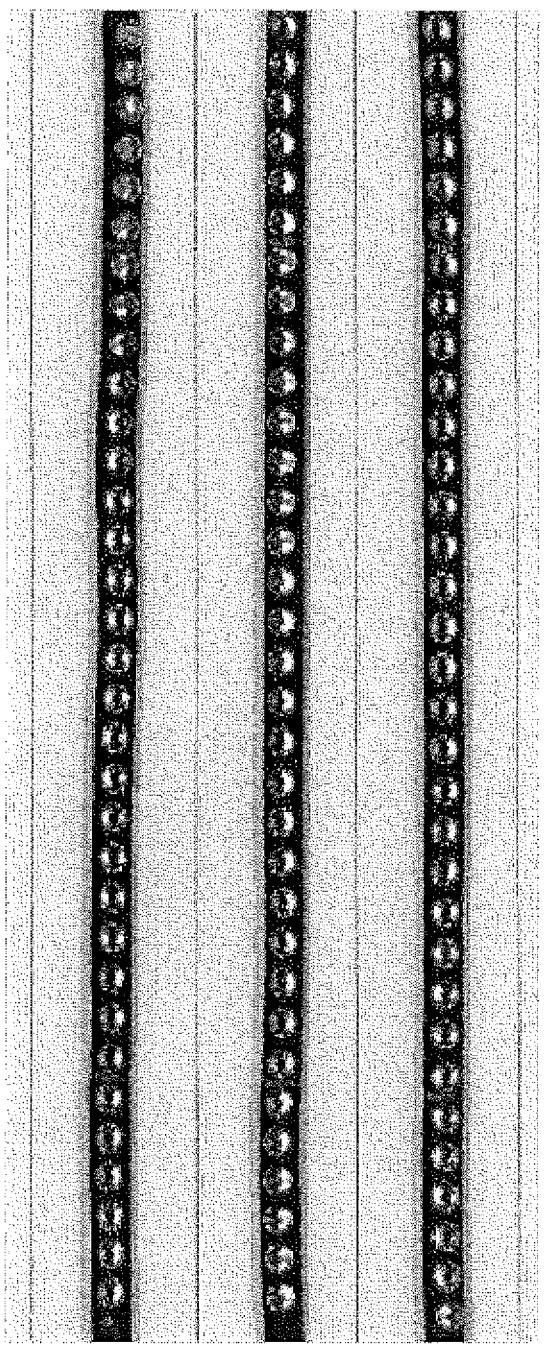

[Fig.6A]
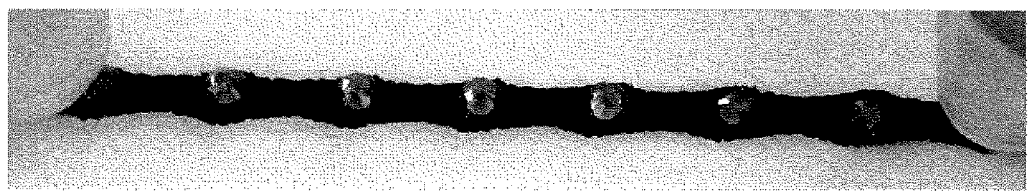
[Fig.6B]
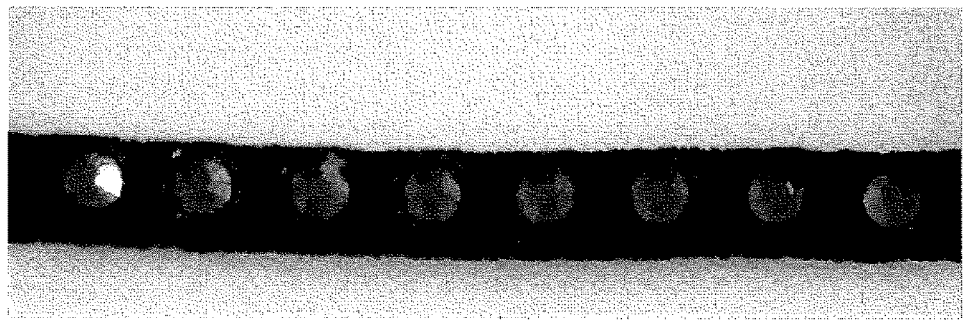

PRODUCT COMPRISING SOLID ADHERED TO ELASTIC MEMBER

TECHNICAL FIELD

The present invention relates to a product comprising a solid strongly adhered to an elastic member.

BACKGROUND ART

There are many ornaments in which a solid for decoration is adhered to the surface of a product. In this adhesion, it is required that there is an adhesive strength that can withstand use, and the position of adhesion is not externally visible such that design as an ornament is not impaired.

Patent Literature 1 describes adhesion of a solid to a member having a flexible planar shape such as cloth or leather. Patent Literature 1 describes a method of adhering leather and a crystal glass with a sufficient strength, without causing deterioration of external appearance of leather due to an adhesive.

Meanwhile, as ornaments such as hair bands and bracelets, many ornaments in which a solid for decoration is adhered to an elastic member having high elasticity, such as a rubber, have been commercially available. However, in order to make an ornament in which a solid for decoration is adhered commercially available, it is required that the solid is adhered with adhesive force that can sufficiently endure repeated washing, friction due to contact with other members, collision with other members and the like. While not wishing to be bound by theory, the inventors of the present invention have considered that adhesive force exceeding $2.5 \times 10^6$ Pa is at least preferable for making an ornament in which a solid for decoration is adhered commercially available, and beyond that, adhesive force of $2.7 \times 10^6$ Pa or $3.0 \times 10^6$ Pa or higher is further preferable.

However, in adhesion of a solid to an elastic member, an adhesive surface itself of the elastic member was stretched. Thus, it was difficult to achieve such adhesive force. Further, when the cross section of the elastic member had a circular shape, it was even more difficult to achieve such adhesive force since the solid was more likely to come off. As a result, none of the products that are currently commercially available has a sufficient adhesive strength of a solid to an elastic member, and they do not have satisfying durability. Patent Literature 1 also does not describe adhesion of a solid to an elastic member having high elasticity such as a rubber.

CITATION LIST

Patent Literature

[PTL 1]
Japanese Laid-Open Publication No. 2002-249729

SUMMARY OF INVENTION

Technical Problem

Accordingly, the present invention has a problem to be solved of providing adhesion of a solid to an elastic member with a sufficient adhesive strength.

Solution to Problem

The inventors of the present invention have unexpectedly discovered that a solid can be adhered to an elastic member having high elasticity with a sufficient adhesive strength, and solved the above-described problem. According to the present invention, adhesion of an elastic member and a solid with excellent durability, that is, with adhesive force of $2.5 \times 10^6$ Pa or more, more preferably adhesive force of $2.7 \times 10^6$ Pa or more, even more preferably adhesive force of $3.0 \times 10^6$ Pa or more, and particularly preferably adhesive force of $3.5 \times 10^6$ Pa or more, is provided.

The unexpected point is that the above-described adhesive force is also achieved in an elastic member having a cross section that is in a substantially circular shape where an adhesive surface does not become a planar surface.

In an aspect, the present invention provides a product comprising an elastic member having at least 200% elongation and a solid adhered to the elastic member with a hot-melt adhesive.

In an embodiment, the above-described solid is adhered to the above-described elastic member with adhesive force of $2.5 \times 10^6$ Pa or more.

In another embodiment, the above-described solid is adhered to the above-described elastic member with adhesive force of $2.7 \times 10^6$ Pa or more.

In yet another embodiment, the above-described solid is adhered to the above-described elastic member with adhesive force of $3.0 \times 10^6$ Pa or more.

In further yet another embodiment, the above-described solid is adhered to the above-described elastic member with adhesive force of $3.5 \times 10^6$ Pa or more.

In an embodiment, at the time of detachment of the above-described solid and the above-described elastic member, the elongation of the elastic member is 200% or more.

In an embodiment, the cross section of the above-described elastic member is in a substantially circular shape.

In an embodiment, the diameter of the cross section of the above-described elastic member is about 3-10 mm.

In another embodiment, the diameter of the cross section of the above-described elastic member is about 3-6 mm.

In another embodiment, the diameter of the cross section of the above-described elastic member is about 4-5 mm.

In an embodiment, the present invention comprises at least two solids, wherein the gap between the solids is about 1-4 mm.

In another embodiment, the above-described gap is about 1-2 mm.

In an embodiment, the above-described elastic member is a rubber.

In an embodiment, the above-described solid is a crystal glass.

Advantageous Effects of Invention

According to the present invention, a solid can be adhered to an elastic member having high elasticity such as a rubber with a sufficient adhesive strength. Specifically, according to the present invention, adhesion of an elastic member and a solid of excellent durability with adhesive force of $2.5 \times 10^6$ Pa or more, more preferably adhesive force of $2.7 \times 10^6$ Pa or more, even more preferably adhesive force of $3.0 \times 10^6$ Pa or more, and particularly preferably adhesive force of $3.5 \times 10^6$ Pa or more, may be provided.

In addition, the above-described high adhesive force may be provided even if the elastic member is a member having a cross section that is in a substantially circular shape where adhesion of a solid is difficult.

Additionally, or alternatively, the above-described high adhesive force may be provided even in the case of adhering a plurality of solids to an elastic member with a small distance gap of about 1-4 mm.

BRIEF DESCRIPTION OF DRAWINGS

FIG. 1 is a schematic diagram showing adhesion of a crystal glass to a rubber of the present invention.

FIG. 2 is a schematic diagram showing conventional adhesion of a crystal glass to a rubber.

FIG. 3 is a schematic diagram showing measurement of detachment strength.

FIG. 4 is a diagram showing falling off of a crystal glass from a rubber in Jungle test of conventional products.

FIG. 5 is a diagram showing the result of De Mattia test of the product of the present invention.

FIG. 6A shows a rubber to which a crystal glass is adhered in an elongated state.

FIG. 6B shows a rubber to which a crystal glass is adhered in a non-elongated state.

DESCRIPTION OF EMBODIMENTS

Hereinafter, the present invention will be described with illustrated examples by referring to the attached drawings as necessary. Throughout the present specification, it should be understood that unless particularly stated otherwise, an expression in its singular form also includes the conception of plurality. It should be also understood that unless particularly stated otherwise, the terms used in the present specification have the meanings that are conventionally used in the art. Therefore, unless defined otherwise, all technical and scientific terms used in the present specification have the same meanings as commonly understood by those having ordinary skill in the art to which the present invention pertains. In the case of conflict, the present specification, including the definitions, will claim priority.

Embodiments that will be provided below are provided for better understanding of the present invention, and the scope of the present invention should not be limited to the following descriptions. It is clear to those skilled in the art that modification can be appropriately performed within the scope of the present invention by taking into consideration the descriptions of the present specification.

The present invention provides adhesion of an elastic member having high elasticity and a solid with a sufficient adhesive strength. As ornaments such as hair bands and bracelets, many ornaments in which a solid for decoration is adhered to an elastic member having high elasticity, such as a rubber, have been commercially available. However, none of the products that are currently commercially available has a sufficient adhesive strength, and a solid comes off from an elastic member when expansion and contraction are repeated.

Definition

The term "elastic member" as used herein refers to any member having an elongation of 200% or more.

The term "elongation" as used herein refers to an index relatively indicating the level of stretch without causing fracture at the time of giving certain tensile force from a normal state where tensile force is not given.

The term "rubber" as used herein refers to both natural and synthetic rubber compounds or a combination thereof.

The term "solid" as used herein refers to any member having fixed geometry that does not easily deform at room temperature.

The term "adhesive" as used herein refers to any substance that allows adhesion of an elastic member and a solid.

The term "hot-melt adhesive" as used herein refers to any adhesive that will be in a liquid form and shows flowability by heating, and goes back to a solid state by cooling.

The "gap between the solids" as used herein refers to a minimal distance between a solid and another solid.

The term "substantially circular shape" as used herein refers to any shape that is closed by a gentle curve, and it is not limited to a perfect circle or ellipse.

The term "adhesive force" between an elastic member and a solid as used herein refers to, when a solid is adhered roughly to the central portion of an elastic member and edges of this elastic member are fixed to stretch the solid with a head speed of 300 mm per minute under room temperature (25° C.) atmosphere, tensile force (Pa) that detaches the above-described solid and the above-described elastic member. Refer to FIG. 3.

The term "elongation of the elastic member at the time of detachment" of the solid and the elastic member as used herein refers to, when a solid is adhered roughly to the central portion of an elastic member and both ends of this elastic member are fixed to stretch the solid with a head speed of 300 mm per minute under room temperature (25° C.) atmosphere, elongation (%) of the elastic member when the above-described solid and the above-described elastic member are detached.

The term "not affect the solid or elastic member" as used herein refers to the point that the solid or elastic member is not melted, deformed or deteriorated, and the physical characteristic of the solid or elastic member is not changed.

The term "about" as used herein refers to a range within ±10% of a numerical value following this term.

(Elastic Member)

In the present invention, the elastic member is any member having an elongation of about 200% or more. In a preferred embodiment, the elastic member of the present invention has an elongation of about 210% or more, about 220% or more, about 230% or more, about 240% or more, about 250% or more, about 260% or more, about 270% or more, about 280% or more, about 290% or more, about 300% or more, about 310% or more, about 320% or more, about 330% or more, about 340% or more, or about 350% or more.

In a preferred embodiment, the elastic member of the present invention is a rubber.

The elastic member of the present invention may be or may not be coated with a coating layer having elasticity. In a preferred embodiment, the elastic member of the present invention is a rubber coated with a coating layer having elasticity. This coating layer can be any member as long as it can achieve the above-described elongation of the elastic member. However, it is preferably made of polyamide resin (for example, nylon) and more preferably made of fiber, so-called wooly nylon, where fiber of polyamide resin (for example, nylon) is processed to allow the fiber to have a woolen-like texture.

As the above-described rubber, various synthetic rubbers and natural rubbers can be used. For example, butadiene rubber, isoprene rubber, chloroprene rubber, styrene-butadiene rubber, isobutylene-isoprene rubber, acrylonitrile-butadiene rubber, ethylene-propylene copolymer, ethylene-propylene-diene copolymer, acrylic rubber, silicone rubber, urethane rubber and ethylene-vinyl acetate copolymer can be mentioned. A combination of two or more types of these also can be used.

In an embodiment, the elastic member of the present invention is a member in which the cross section is a substantially circular shape. It was not known prior to the present invention that a high adhesive strength can be provided at the time of adhering a solid (in particular, a solid in which an adhesive surface with an elastic member is a planar surface) to a member having a cross section that is in a substantially circular shape. Accordingly, the present invention is remarkable and unexpected on the point that a solid (in particular, a solid in which an adhesive surface with an elastic member is a substantially planar surface) is allowed to be adhered to an elastic member having a cross section that is in a substantially circular shape with sufficiently high adhesive force (for example, an adhesive force of $2.5 \times 10^6$ Pa or more, more preferably adhesive force of $2.7 \times 10^6$ Pa or more, even more preferably adhesive force of $3.0 \times 10^6$ Pa or more, and most preferably adhesive force of $3.5 \times 10^6$ Pa or more). Further, it should be noted that the substantially circular shape as used herein refers to any shape that is closed by a gentle curve, and it is not strictly limited to a perfect circle or ellipse.

The diameter of the elastic member having a cross section that is in a substantially circular shape of the present invention is representatively about 3 mm to about 10 mm. It is about 3 mm to about 6 mm in a preferred embodiment, and is about 4 mm to about 5 mm in a more preferred embodiment.

(Solid)

The solid of the present invention can be any substance as long as it has a certain shape. However, it is particularly a crystal glass, jewel or the like for decoration.

The solid of the present invention can be in any size. However, in general, it has a size that fits in a cube where one side is about 10 mm. Typically, it has a size that fits in a cube where one side is about 5 mm (for example, a crystal glass having a diameter of about 1 mm to about 3 mm).

In an embodiment, a solid of the present invention is such that an adhesive surface with an elastic member is a substantially planar surface. Further, it should be noted that "substantially planar surface" as used herein is not limited to a complete flat surface, and it encompasses a gently curved surface as long as the surface lies continuously.

The "diameter" of the adhesive surface of the solid of the present invention refers to a maximal length of two different points on the adhesive surface.

(Adhesive)

The adhesive of the present invention is a hot-melt adhesive. The examples of the hot-melt adhesive are ethylene-vinyl acetate copolymer resin (EVA)-based adhesive, polyethylene-based adhesive, polyamide-based adhesive, polyisobutylene-based adhesive and polyester-based adhesive.

(Adhesive Force)

The "adhesive force" between the elastic member and the solid as used herein refers to, when an elastic member is fixed at two points holding the adhered solid therebetween and the above-described solid is stretched with a head speed of 300 mm per minute under room temperature (25° C.) atmosphere, tensile force (Pa) that detaches the above-described solid and the above-described elastic member.

Specifically, a solid is adhered roughly to the central portion of an elastic member and each of the edges of this elastic member are fixed (FIG. 3). Further, the solid is held with a tool and the solid is stretched in the direction of arrow a of FIG. 3 at the speed of 300 mm per minute under 25° C. atmosphere to measure strength at the time of detachment of the solid from the elastic member.

In order to make an ornament in which a solid for decoration is adhered commercially available, it is required that the solid is adhered with adhesive force that can sufficiently endure repetitive washing, friction due to contact with other members, collision with other members and the like. While not wishing to be bound by theory, the inventors of the present invention have considered that adhesive force exceeding $2.5 \times 10^6$ Pa is at least preferable for making an ornament in which a solid for decoration is adhered commercially available, and beyond that, adhesive force of $2.7 \times 10^6$ Pa or $3.0 \times 10^6$ Pa or higher is further preferable. However, in adhesion of a solid to an elastic member, an adhesive surface itself of the elastic member is stretched. Thus, it was difficult to achieve such adhesive force. Further, when the cross section of an elastic member has a circular shape, it was even more difficult to achieve such adhesive force since the solid is more easily detached. Alternatively, such adhesive force was difficult to achieve also in the case of adhering a plurality of solids to an elastic member with a small distance gap of about 1-4 mm.

According to the present invention, a solid can be adhered to an elastic member having high elasticity such as a rubber with a sufficient adhesive strength. Specifically, according to the present invention, adhesion of an elastic member and a solid of excellent durability with adhesive force of $2.5 \times 10^6$ Pa or more, more preferably adhesive force of $2.7 \times 10^6$ Pa, even more preferably adhesive force of $3.0 \times 10^6$ Pa, and particularly preferably adhesive force of $3.5 \times 10^6$ Pa or more, is provided. More specifically, according to the present invention, adhesion of an elastic member and a solid of excellent durability with adhesive force of $2.5 \times 10^6$ Pa or more, $2.6 \times 10^6$ Pa or more, $2.7 \times 10^6$ Pa or more, $2.8 \times 10^6$ Pa or more, $2.9 \times 10^6$ Pa or more, $3.0 \times 10^6$ Pa or more, $3.1 \times 10^6$ Pa or more, $3.2 \times 10^6$ Pa or more, $3.3 \times 10^6$ Pa or more, $3.4 \times 10^6$ Pa or more, or $3.5 \times 10^6$ Pa or more, is provided.

In addition, the above-described high adhesive force may be provided even if the elastic member is a member having a cross section that is in a substantially circular shape where adhesion of a solid is difficult.

Additionally, or alternatively, the above-described high adhesive force may be provided even in the case of adhering a plurality of solids to an elastic member with a small distance gap of about 1-4 mm.

(Production Method)

A production method of a product according to the present invention is shown in FIG. 1. Further, FIG. 1 shows an example of using a crystal glass as a solid and a synthetic rubber having a cross section in a substantially circular shape and elongation of 280% as an elastic member.

A hot-melt adhesive is applied to the bottom surface of the solid. As shown in FIG. 1(A), the solid to which a hot-melt adhesive is applied to the bottom surface is pressed to the elastic member using a nozzle. At this stage, the hot-melt adhesive has been solidified, and the solid will not be adhered to the elastic member.

As shown in FIG. 1(B), while the solid is pressed against the elastic member using the nozzle, the internal temperature is heated to higher than a melting point of the hot-melt adhesive.

This heating can be performed with any temperature as long as the hot-melt adhesive melts without affecting the rubber or crystal glass. However, the temperature is generally about 130° C. to about 200° C., and more representatively about 150° C. to about 180° C.

The strength of pressing of the solid against the elastic member at the time of heating can be any strength as long as the solid is positioned to the desired position on the elastic member without causing damage to the solid and elastic member.

The time for the above-described heating can be any time which achieves sufficient meltdown of the hot-melt adhesive and that does not affect the solid or elastic member. The heating time is representatively within about 10 seconds, and more representatively about 2 to about 5 seconds.

Subsequently, as shown in FIG. 1(C), while the solid is pressed against the elastic member using the nozzle, rapid cooling is performed to solidify the hot-melt adhesive. In this regard, the pressing of the solid can be performed with any means that can press the solid to the elastic member in an appropriate direction at an intended pressure. Examples of this means include, but are not limited to, holding with a nozzle or tool, blowing with air, suction with air and the like.

The pressing of the solid to the elastic member at the time of cooling is performed preferably with a strength of about 2 kg weight/cm$^2$ to about 10 kg weight/cm$^2$, and representatively about 5 kg weight/cm$^2$.

The above-described cooling can be performed with any temperature and time which can rapidly solidify the melted hot-melt adhesive and that do not affect the solid or elastic member.

Under an environment of normal temperature, the temperature of the hot-melt adhesive decreases rapidly. In the present invention, it is important that the hot-melt adhesive is solidified in a pressurized state since the adhesive strength becomes weak if cooling starts before pressurization.

Accordingly, in order to ensure sufficient adhesive strength, the heating step of FIG. 1(B) transitions to the cooling step of FIG. 1(C) within about 2 seconds, preferably within about 1 second, and more preferably about 0.5 second.

Other Embodiment

The present invention has been explained by showing its preferred embodiments for easier understanding. The present invention will be explained based on its examples below. However, the aforementioned explanation and the examples below are provided solely for the purpose of illustration, and they are not provided for the purpose of limiting the present invention. Accordingly, the scope of the present invention is limited neither by the embodiments or examples specifically described in the present specification, and it is limited solely based on the scope of the claims.

EXAMPLES

Example 1 Adhesion of Solid to Elastic Member

As shown in FIG. 1, a crystal glass 10 was disposed at the central portion of an elongated rubber 11, and this crystal glass 10 was adhered to the rubber 11 with a hot-melt adhesive 13.

The crystal glass 10 had a bottom surface with a diameter of about 5 mm. This rubber 11 was a synthetic rubber with a diameter of about 5 mm and a cross section in a substantially circular shape, wherein the elongation was 280%. The adhesive may be any hot-melt adhesive. However, this embodiment used high density polyethylene-based adhesive with a melting point of about 130° C.

As shown in FIG. 1(A), the crystal glass 10 having the hot-melt adhesive 13 applied to the bottom surface was pressed to the rubber 11 using a nozzle 12. At this stage, the hot-melt adhesive 13 was in a solidified state.

As shown in FIG. 1(B), while pressing the crystal glass 10 against the rubber 11 using the nozzle 12, they were put into a heater 15 where the internal temperature was heated to 150-180° C. for about 2-5 seconds. Due to this, the hot-melt adhesive 13 was heated to 150° C.-180° C., and was melted between the crystal glass 10 and the rubber 11.

Subsequently, as shown in FIG. 1(C), while the crystal glass 10 was pressed against the rubber 11 at about 5 kg weight/cm$^2$ using the nozzle 12, they were rapidly cooled to solidify the hot-melt adhesive 13. The transition to the step of FIG. 1(C) is preferably made within about 1 second after the completion of the step of FIG. 1(B).

In the manner described above, a product in which the crystal glass is adhered to the rubber was obtained. The crystal glass and rubber after adhesion had a beautiful external appearance where marks of adhesion cannot be seen at all from the outside.

Comparative Example 1

As in the case of Example 1, a crystal glass and a rubber were used for adhesion of the crystal glass and the rubber. This rubber was a synthetic rubber with a diameter of about 5 mm and a cross section in a substantially circular shape, wherein the elongation was 280%.

In Comparative example 1, as commonly performed in the subject technical field, while the crystal glass having a hot-melt adhesive applied to the bottom surface is pressed to the rubber, ultrasonic vibration was provided to melt the hot-melt adhesive, and subsequently the hot-melt adhesive was solidified at normal temperature for adhesion of the crystal glass and the rubber. The specification of this ultrasonic vibration apparatus was such that the input voltage was 200V, input current was 15 A, output power was 1200 W and vibrational frequency was 19.15 kHz.

In the product where the crystal glass was adhered to the rubber of Comparative example 1, the adhesive stuck out from the bottom surface of the crystal glass, and marks of adhesion were visible from the outside. Thus, the external appearance was impaired compared to the product of Example 1.

Comparative Example 2

As in the case of Example 1, a crystal glass and a rubber were used for adhesion of the crystal glass and the rubber. This rubber was a synthetic rubber with a diameter of about 5 mm and a cross section in a substantially circular shape, wherein the elongation was 280%.

However, in this Comparative example, unlike Example 1, pressing of the crystal glass to the rubber was performed by using a plate-like member for pressurization rather than a nozzle.

As shown in FIG. 2(A), the crystal glass 20 having the hot-melt adhesive 23 applied to the bottom surface was pressed to the rubber 21 using the nozzle 22. At this stage, the hot-melt adhesive 23 was in a solidified state.

As shown in FIG. 2(B), while the crystal glass 20 was pressed against the rubber 21 using the plate-like member 22 for pressurization, they were put into a heater 15 where the internal temperature was heated to 150-180° C. for about 2 to 5 seconds. Due to this, the hot-melt adhesive 23 was heated to 150° C. to 180° C., and was melted between the crystal glass 20 and the rubber 21.

Subsequently, as shown in FIG. 2(C), while the crystal glass 20 was pressed against the rubber 21 at about 5 kg weight/cm² using the plate-like member 22 for pressurization, they were rapidly cooled to solidify the hot-melt adhesive 23.

In the product where the crystal glass was adhered to the rubber of Comparative example 2, marks of the adhesive were not visible from the outside as in the case of Example 1, and the product had a beautiful external appearance.

Example 2 Detachment Strength Test

For each of the products that were obtained in Example 1, Comparative example 1 and Comparative example 2, a detachment strength test was performed to examine adhesive strength of the crystal glass to the rubber. The detachment strength test was conducted in CONSUMER PRODUCT END-USE RESEARCH INSTITUTE CO., LTD. (Osaka, Japan). The test was carried out for four products obtained in each of Example 1, Comparative example 1 and Comparative example 2.

Specifically, as shown in FIG. 3, a tension tester was used to stretch the crystal glass from the rubber, and detachment strength at the time of detachment was measured. The rubber was folded into half while having the crystal glass as the apex, the rubber was sandwiched and the bottom part was fixed in a state where 4 cm of the rubber was exposed (FIG. 3). Further, the rubber was held and the solid was stretched in the direction of arrow a of FIG. 3 at the speed of 300 mm per minute under 25° C. atmosphere to measure the strength at the time of detachment of the crystal glass from the rubber. The test was carried out for four products obtained in each of Example 1, Comparative example 1 and Comparative example 2.

The test result is shown below.

TABLE 1

(Table 1 Result of detachment strength test)

|  | Example 1 Detachment strength | Comparative example 1 Detachment strength | Comparative example 2 Detachment strength |
| --- | --- | --- | --- |
| 1 | 69N | 33N | 44N |
| 2 | 63N | 36N | 8N* |
| 3 | 54N | 35N | 38N |
| 4 | 65N | 27N | 42N |
| Average | 63N | 33N | 41N |

*Since the result of "8N" of Comparative example 2 is considered to be a mistake at the time of adhesion, it is excluded from the calculation of an average value and discussion of the result below.

The adhesive surface of the crystal glass and the rubber, that is, the bottom surface of the crystal glass is in a substantially circular shape with a diameter of about 5 mm, and thus the area thereof is about $2.0 \times 10^{-5}$ m².

Accordingly, when the above-described test result is converted into detachment strength (Pa=N/m²), it will be as below.

TABLE 2

(Table 2 Result of detachment strength test (Pa))

|  | Example 1 | Comparative example 1 | Comparative example 2 |
| --- | --- | --- | --- |
| 1 | $3.5 \times 10^6$ Pa | $1.7 \times 10^6$ Pa | $2.2 \times 10^6$ Pa |
| 2 | $3.2 \times 10^6$ Pa | $1.8 \times 10^6$ Pa | — |
| 3 | $2.7 \times 10^6$ Pa | $1.8 \times 10^6$ Pa | $1.9 \times 10^6$ Pa |

TABLE 2-continued (Table 2 Result of detachment strength test (Pa))

|  | Example 1 | Comparative example 1 | Comparative example 2 |
| --- | --- | --- | --- |
| 4 | $3.3 \times 10^6$ Pa | $1.4 \times 10^6$ Pa | $2.1 \times 10^6$ Pa |
| Average | $3.2 \times 10^6$ Pa | $1.7 \times 10^6$ Pa | $2.1 \times 10^6$ Pa |

From the result above, it was made clear that in the product of Example 1, the crystal glass was adhered to the rubber with a significant strength compared to Comparative example 1 and Comparative example 2. Specifically, the product of Example 1 had about 190% detachment strength with respect to the product of Comparative example 1, and about 150% detachment strength with respect to the product of Comparative example 2.

The point that a solid such as a crystal glass can be adhered to a rubber having high elasticity and a cross section in a substantially circular shape, which is commonly considered as difficult to allow adhesion, with such a high adhesive force was not known in the subject technical field, and it was unexpected.

Since the solid was pressurized using the nozzle in Example 1, the solid did not move on the elastic member with a cross section in a substantially circular shape, and the intended pressure was applied to the solid in an appropriate direction. On the other hand, it is considered that since the solid was pressurized using the plate-like member in Comparative example 2, the solid moved on the elastic member with a cross section in a substantially circular shape, and the pressure was applied to the solid from various directions and the intended pressure was not applied. While not wishing to be bound by theory, it is considered that a difference in adhesive force was caused due to this difference.

Accordingly, the high adhesive force of the present invention can be achieved not only in the case of pressurizing the solid using the nozzle as in Example 1, but also by any means that can apply an intended pressure in an appropriate direction to the solid (for example, holding with a tool and then pressurizing, blowing with air or suction with air).

Example 3 Jungle Test

For the products obtained in Example 1 and Comparative example 2, a test was further performed to examine the state of adhesion of the rubber and the crystal glass. The Jungle test was also conducted in CONSUMER PRODUCT END-USE RESEARCH INSTITUTE CO., LTD. (Osaka, Japan). For the products of Comparative example 1, a further test was not conducted since they clearly had low strength in the above-described detachment strength test. The products used in this Example were such products having 33 crystal glasses on the rubber with a gap of about 1.3 mm.

An artificial sweat having a composition of 40 g of disodium phosphate, 40 g of sodium chloride, 25 g of acetic acid and 895 g of distilled water was put into a desiccator, and the products of Example 1 and Comparative example 2 were suspended from the upper part. The desiccator in a sealed state (humidity of 95% or higher) was put into an incubator at a temperature of 70° C., and after each of the products were exposed for 2, 4 and 6 days, washing with water and drying were performed. Two samples each were provided for the test.

For products of Example 1, falling off of the crystal glass from the rubber was not seen in all of the treatment periods of 2, 4 and 6 days (not shown). FIG. 4A shows the result of one sample for each of 2, 4 and 6 days.

On the other hand, for the products of Comparative example 2, falling off of one crystal glass was observed in one sample in 2 days, and falling off of one crystal glass was further observed in one sample in 4 days (FIG. 4).

Example 4 De Mattia Test

For the products of Example 1, which were treated for 2, 4 and 6 days in Example 3, stretching was further repeatedly performed using a De Mattia tester. The De Mattia test was also conducted in CONSUMER PRODUCT END-USE RESEARCH INSTITUTE CO., LTD. (Osaka, Japan). The test was performed up to 5000 times with 11 cm of distance between chucks and 60% of elongation. However, whether or not the crystal glass has fallen off was confirmed also at the time of 1000 times and 3000 times.

After repeated stretching of 5000 times, falling off of the crystal glass was not seen in all of the treatment periods of 2, 4 and 6 days (FIG. 5). From these results, it was made clear that high adhesive force was provided also in the case of adhering a plurality of solids to an elastic member with a small distance gap of about 1-4 mm.

As above, according to the present invention, a solid can be adhered to an elastic member having high elasticity such as a rubber with a sufficient adhesive strength. Specifically, according to the present invention, adhesion of an elastic member and a solid of excellent durability with adhesive force of $2.5 \times 10^6$ Pa or more, more preferably adhesive force of $2.7 \times 10^6$ Pa or more, even more preferably adhesive force of $3.0 \times 10^6$ Pa or more, and particularly preferably adhesive force of $3.5 \times 10^6$ Pa or more, is provided.

In addition, the above-described high adhesive force is provided even if the elastic member is a member having a cross section that is in a substantially circular shape where adhesion of a solid is difficult.

Additionally, or alternatively, the above-described high adhesive force is provided even in the case of adhering a plurality of solids to an elastic member with a small distance gap of about 1-4 mm.

In a product of the present invention, a solid is adhered to an elastic member with a strong adhesive strength. Thus, even if the elastic member is stretched, the adhesive surface of the solid does not change, and in contrast to portions becoming thinner due to stretching of the elastic member, the adhered position of the solid does not become thin. As a result, it looks like a knot (refer to FIG. 6A where a rubber to which a crystal glass is adhered is stretched, and FIG. 6B where the rubber is not stretched).

INDUSTRIAL APPLICABILITY

The present invention can provide, in adhesion of a solid for decoration to an elastic member having high elasticity such as a rubber, a sufficient adhesive strength where the solid does not easily come off from the elastic member. Accordingly, the present invention is useful in production of ornaments such as hair bands and bracelets where a solid for decoration is adhered to an elastic member having high elasticity such as a rubber.

REFERENCE NUMERAL LIST 10, 20 crystal glass
11, 21 rubber
12 nozzle
13, 23 hot-melt adhesive
22 plate-like member for pressurization

The invention claimed is:

1. A product comprising an elastic member having at least 200% elongation and at least two solids adhered to the elastic member with a hot-melt adhesive, wherein:
   the elastic member is rubber;
   the at least two solids are each a crystal glass and each has a size that fits within dimensions of a cube where one side of the cube is about 10 mm;
   adhesive surfaces of the at least two solids and the elastic member are substantially planar surfaces;
   the gap between the at least two solids is about 1-4 mm;
   the at least two solids are adhered to the elastic member with adhesive force of $2.5 \times 10^6$ Pa or more; and
   each of the at least two solids have been adhered to the elastic member by melting the hot-melt adhesive between the solid and the elastic member, and cooling the adhesive while pressing the solid to the elastic member at a strength of about 2 kg/cm$^2$ to about 10 kg/cm$^2$.

2. The product of claim 1, wherein the at least two solids are adhered to the elastic member with adhesive force of $2.7 \times 10^6$ Pa or more.

3. The product of claim 2, wherein the at least two solids are adhered to the elastic member with adhesive force of $3.0 \times 10^6$ Pa or more.

4. The product of claim 3, wherein the at least two solids are adhered to the elastic member with adhesive force of $3.5 \times 10^6$ Pa or more.

5. The product of claim 1, wherein the gap is about 1-2 mm.

6. The product of claim 1, wherein the cross section of the elastic member is in a substantially circular shape.

7. The product of claim 6, wherein the diameter of the cross section of the elastic member is about 3-10 mm.

8. The product of claim 6, wherein the diameter of the cross section of the elastic member is about 3-6 mm.

9. The product of claim 6, the diameter of the cross section of the elastic member is about 4-5 mm.

* * * * *